(12) United States Patent
Palcic et al.

(10) Patent No.: US 7,628,355 B2
(45) Date of Patent: Dec. 8, 2009

(54) VARIABLE SPEED TRANSMISSION FOR A ROTARY WING AIRCRAFT

(75) Inventors: Peter Xavier Palcic, Hamden, CT (US); Todd Garcia, Milford, CT (US); Yuriy Gmirya, Woodbridge, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 11/845,181

(22) Filed: Aug. 27, 2007

(65) Prior Publication Data

US 2008/0173752 A1 Jul. 24, 2008

Related U.S. Application Data

(62) Division of application No. 11/141,631, filed on May 31, 2005, now Pat. No. 7,296,767.

(51) Int. Cl.
*B64C 27/12* (2006.01)

(52) U.S. Cl. .................................... 244/17.11

(58) Field of Classification Search .............. 244/17.11, 244/60, 53 R; 416/60, 170 R; 446/37
See application file for complete search history.

(56) References Cited

U.S. PATENT DOCUMENTS

| | | | |
|---|---|---|---|
| 2,491,191 A | 12/1949 | Maillard et al. | |
| 3,362,255 A | 1/1968 | De Rocca et al. | |
| 3,782,223 A | 1/1974 | Watson | |
| 4,479,619 A * | 10/1984 | Saunders et al. | 244/60 |
| 4,783,023 A | 11/1988 | Jupe | |
| 5,271,295 A | 12/1993 | Marnot | |
| 6,042,499 A | 3/2000 | Goi et al. | |
| 6,254,504 B1 | 7/2001 | Goi et al. | |
| 2002/0145076 A1 | 10/2002 | Alford | |

* cited by examiner

*Primary Examiner*—Tien Dinh
(74) *Attorney, Agent, or Firm*—Carlson, Gaskey & Olds, PC

(57) ABSTRACT

A transmission gearbox for a rotary-wing aircraft includes a main gearbox and a variable speed gearbox in meshing engagement with the main rotor gearbox. The variable speed gearbox permits at least two different RPMs for the main rotor system without disengaging the engine(s) or changing engine RPMs. The variable speed gearbox includes a clutch, preferably a multi-plate clutch, and a freewheel unit for each engine. A gear path drives the main gearbox in a "high rotor speed mode" when the clutch is engaged to drive the main rotor system at high rotor rpm for hover flight profile. A reduced gear path drives the main gearbox in a "low rotor speed mode" when the clutch is disengaged and power is transferred through the freewheel unit, to drive the main rotor system at lower rotor rpm for high speed flight. The variable speed gearbox may be configured for a tail drive system that operates at a continuous speed, a tail drive system that changes speed with the main rotor shaft or for no tail drive system.

24 Claims, 5 Drawing Sheets

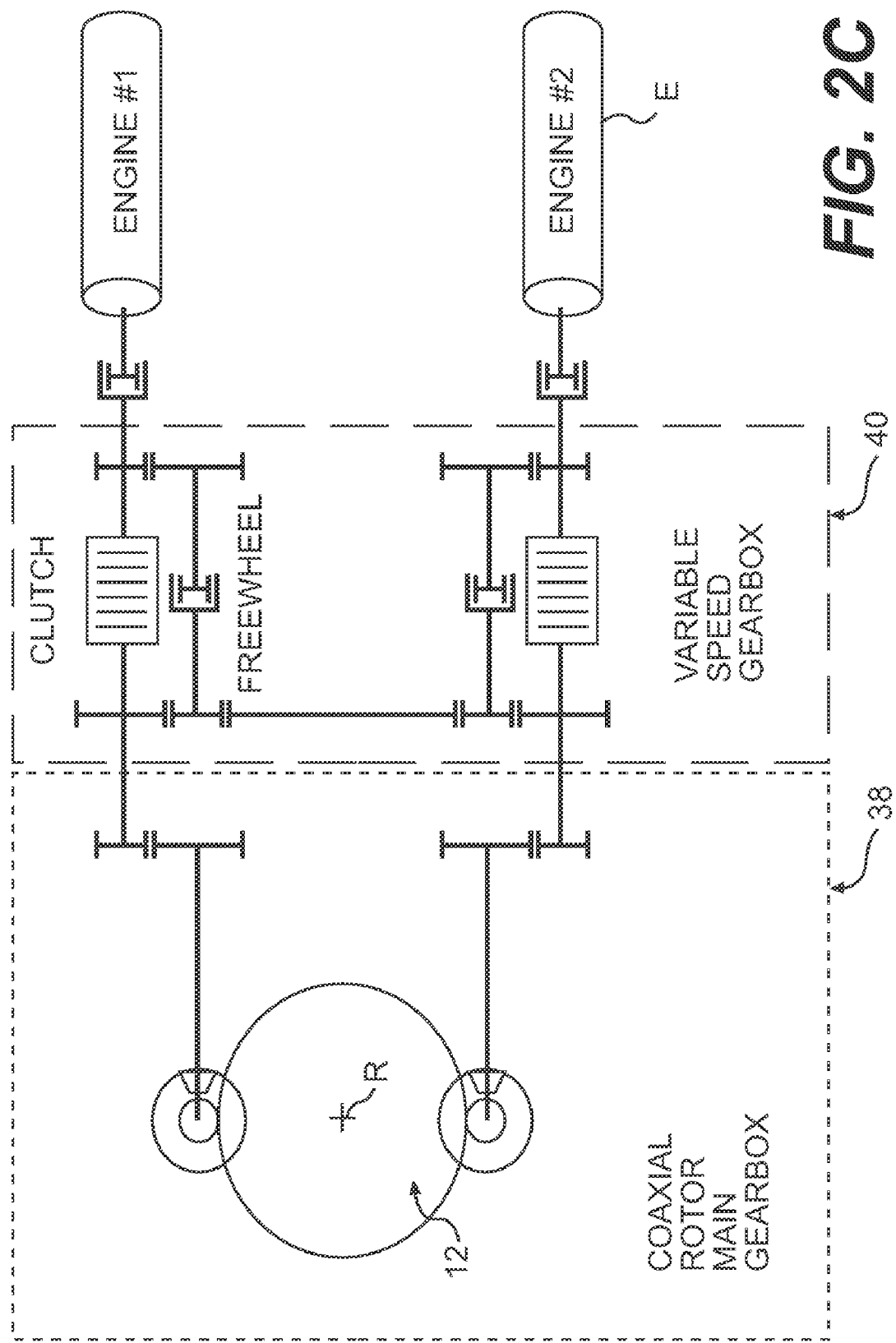

VARIABLE SPEED TRANSMISSION FOR A ROTARY WING AIRCRAFT

The present invention is a divisional application of U.S. patent application Ser. No. 11/141,631, filed May 31, 2005 now U.S. Pat. No. 7,296,797.

BACKGROUND OF THE INVENTION

The present invention relates to a rotary-wing aircraft, and more particularly to a rotary wing transmission gearbox system which provides variable speeds to facilitate high speed and low speed flight profiles.

The forward airspeed of a conventional rotary wing aircraft is limited by a number of factors. Among these is the tendency of the retreating blade to stall at high forward airspeeds. As the forward airspeed increases, the airflow velocity across the retreating blade slows such that the blade may approach a stall condition. In contrast, the airflow velocity across the advancing blade increases with increasing forward speed. Dissymmetry of lift is thereby generated as forward air speed increases.

This dissymmetry of lift may create an unstable condition if not equalized across the advancing and retreating sectors of the rotor disc. Typically, blade flapping and feathering are utilized to substantially equalize the lift.

However, as the forward airspeed is increased beyond a given point for a given rotor rpm, the flapping and feathering action eventually becomes inadequate to maintain substantial equality of lift over the rotor disc. At this point, reverse airflow across the retreating sector creates negative lift and, depending on the forward speed, creates a stalling or negative lift condition that travels outwardly across the blade as airspeed increases. Conventional rotors must be operated at airspeeds lower than those which cause reverse airflow across a substantial part of the retreating blade and at an rpm low enough to alleviate any potential compressibility Mach number problems at the tip of the advancing blade. This has effectively limited forward airspeeds of conventional helicopters to approximately 180 knots.

A rotary wing aircraft with a coaxial counter-rotating rigid rotor system is capable of higher speeds as compared to conventional single rotor helicopters partly due to the balance of lift between the advancing sides of the main rotor blades on the upper and lower rotor systems. In addition, the retreating side of the rotor discs are also generally free from classic retreating blade stall due to offloading of the retreating disc sector with increasing airspeed to obtain roll equilibrium by balancing the net effects of the equal and opposite moments produced by the advancing sectors of the upper and lower counter-rotating rotor systems. To still further increase airspeed, a compound rotary wing aircraft may incorporate supplemental translational thrust.

In high speed flight, the main rotor system may be unloaded from the turbojets, and rotor RPM may be controlled by adjusting collective pitch. For any rotary-wing aircraft, increasing collective pitch slows the rotational speed and decreasing collective pitch increases rotational speed. For a rotary wing aircraft in a high speed flight profile, however, rotor RPM needs to be decreased to prevent the rotor blade tips on the advancing sides of the rotor discs from entering a supersonic region as aircraft airspeed increases. Thus, as forward airspeed increases, collective pitch must be increased to prevent the rotor RPM from increasing to an undesirable level. However, as the forward airspeed is increased beyond a given point for a given rotor rpm, adjusting collective pitch eventually becomes inadequate.

The aerodynamics of high-speed rotary wing aircraft show a noticeable benefit by reducing rotor RPM in high speed cruise flight. The RPM reduction from a hover profile to a high speed flight profile is typically on the order of about 30%. Such a reduction at the engine, however, may cause problems with auxiliary systems, engine operation and available power while, a rotary-wing aircraft, which always operates at a relatively low rotor RPM, may present penalties in rotor and transmission weight, as well as maneuverability constraints. Thus, there is a need for a rotary-wing transmission gearbox system, which provides variable rotor system speeds.

Accordingly, it is desirable to provide a variable speed gearbox system for a rotary-wing aircraft that provides a "high rotor speed mode" and "low rotor speed mode" to maximize aircraft performance during a hover flight profile and a high speed cruise flight profile, respectively.

SUMMARY OF THE INVENTION

A transmission gearbox system of a rotary-wing aircraft according to the present invention includes a main gearbox and a variable speed gearbox in meshing engagement with the main gearbox. The variable speed gearbox permits at least two different main rotor system RPMs without disengaging the engines or changing engine RPM. The variable speed gearbox facilitates different flight spectrums, such as a hover flight profile and a high speed cruise flight profile for any rotary wing aircraft. Typically during landing, take-off, hover and low speed flight profiles, a higher main rotor speed is required for increased lifting capabilities while in a high speed cruise flight profile a lower main rotor speed is desired for improved rotor performance and higher forward airspeed.

The variable speed gearbox includes a clutch, preferably a multi-plate clutch, and a freewheel unit for each engine. In a "high rotor speed mode," when the clutch is engaged to drive the main rotor system at high rotor rpm, a gear path drives the main gearbox in a direct drive (1 to 1 ratio). For a high speed cruise flight profile with a lower rotor RPM in a "low rotor speed mode," the clutch is disengaged and power is transferred through a reduced gear path, preferably by way of a two-stage gear reduction, a freewheel unit and into the main rotor gearbox.

The variable speed gearbox may be configured for a tail drive system that operates at a continuous speed, a tail drive system that changes speed with the main rotor shaft or with no tail drive system. For aircraft models that require a continuous tail speed, the tail drive system may be in meshing engagement with the input side of the clutch and freewheel unit. For aircraft models that would benefit from a tail drive system which changes speed commensurate with the main rotor system, the tail drive system may be in meshing engagement with the output side of the clutch and freewheel unit or directly to the main gearbox to maintain a fixed gear ratio relative to the engine.

The present invention therefore provides a variable speed gearbox system for a rotary-wing aircraft that provides a "high rotor speed mode" and "low rotor speed mode" to maximize aircraft performance during a hover flight profile and a high speed cruise flight profile, respectively.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 2C is a block diagram of an alternative transmission gearbox system of the present invention.

DETAILED DESCRIPTION OF THE PREFERRED EMBODIMENT

Figure 1A:
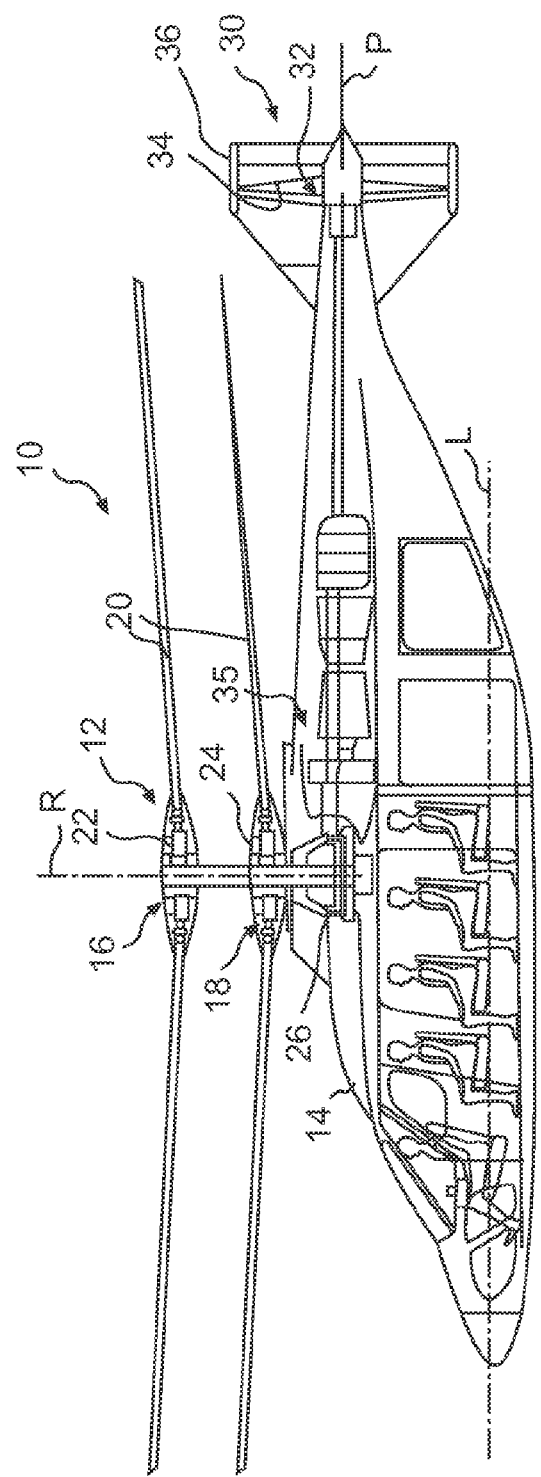
FIG. 1A is a general phantom side view of an exemplary rotary wing aircraft embodiment for use with the present invention.
Figure 1B:
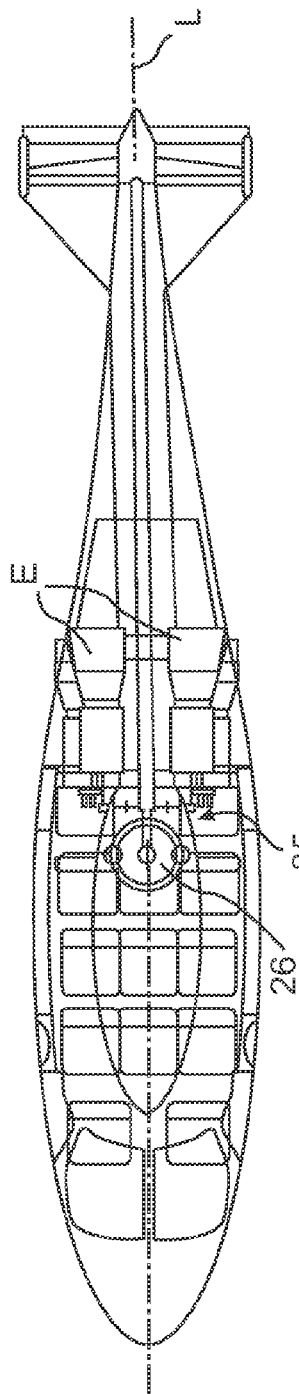
FIG. 1B is a general phantom top view of the exemplary rotary wing aircraft embodiment of FIG. 1A.
Figure 1C:
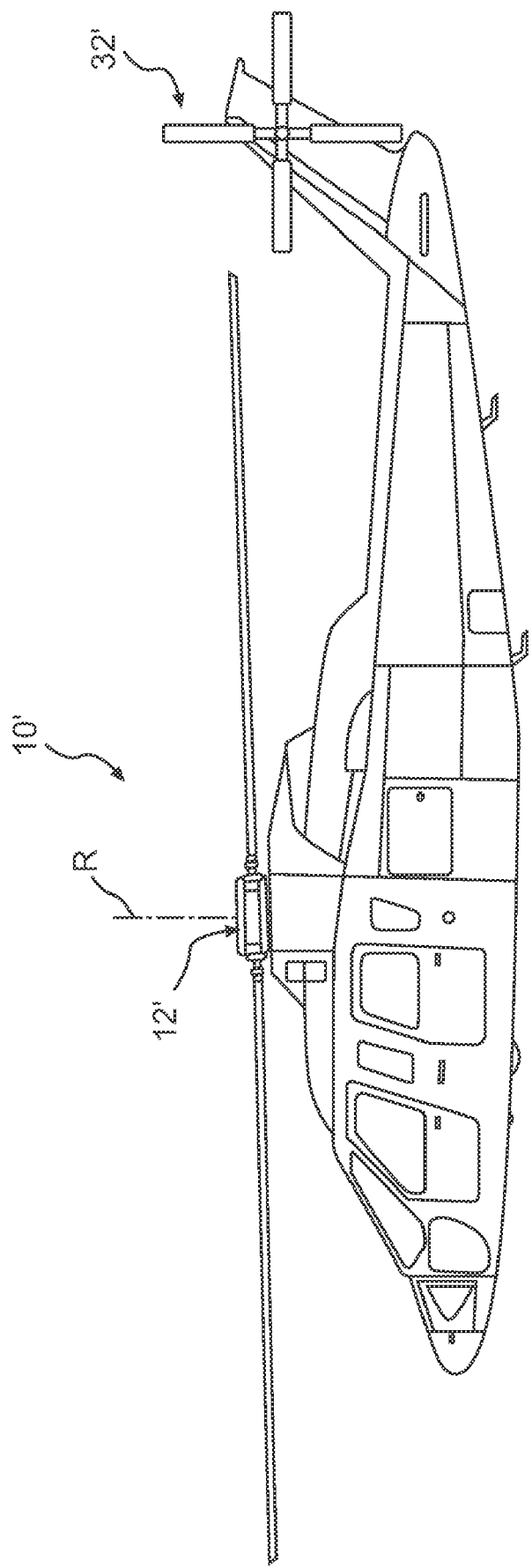
FIG. 1C is a general side views of a rotary wing aircraft with an anti-torque tail rotor embodiment for use with the present invention.

FIGS. 1A and 1B illustrate a vertical takeoff and landing (VTOL) rotary-wing aircraft 10 having a main rotor system 12. The main rotor system 12 is preferably a dual, counter-rotating, coaxial rotor system, however, any other rotor system known in the art including, but not limited to, single, tandem and dual rotor systems may also be used with the present invention. That is, although the present invention is being described in combination with a high speed compound rotary wing aircraft, other aircraft configurations, including a more conventional configuration with a single main rotor system 12' and an anti-torque tail rotor system 32' (FIG. 1C) will also benefit from the present invention.

As shown, the aircraft 10 includes an airframe 14 which supports the main rotor system 12. The aircraft 10 may also incorporate a tail drive system 30. The tail drive system 30 is preferably a translational thrust system 32 that provides translational thrust generally parallel to an aircraft longitudinal axis L.

The main rotor system 12 preferably includes a first rotor system 16 and a second rotor system 18. Each rotor system 16, 18 includes a plurality of rotor blades 20 mounted to a rotor hub 22, 24 for rotation about a rotor axis of rotation R. A drive system 35 drives the main rotor system 12. The translational thrust system 32 preferably includes a pusher propeller 34 having a propeller rotational axis P oriented substantially horizontal and parallel to the aircraft longitudinal axis L to provide thrust for high-speed flight. Preferably, the pusher propeller 32 is mounted within an aerodynamic cowling 36 mounted to the rear of the airframe 14. The translational thrust system 32 is preferably driven by the same drive system 35 which drives the main rotor system 12.

Figure 2A:
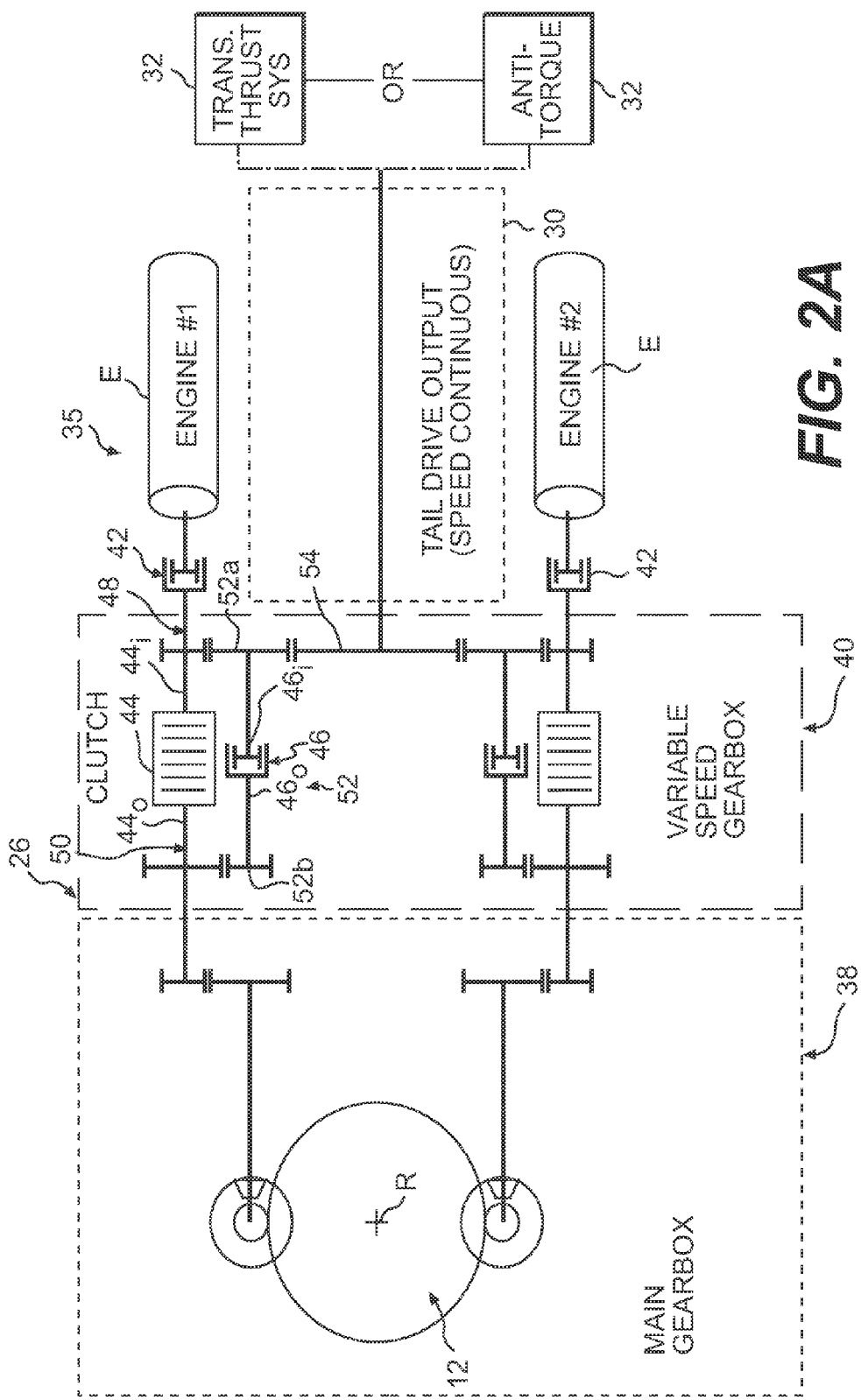
FIG. 2A is a block diagram of a transmission gearbox system of the present invention.

Referring to FIG. 2A, the drive system 35 of the aircraft 10 is schematically illustrated. A gearbox 26 is preferably interposed between one or more gas turbine engines (illustrated schematically at E), the main rotor system 12 and the translational thrust system 32. Preferably, the gearbox 26 includes a main gearbox 38 and a variable speed gearbox 40 in meshing engagement with the main gearbox 38. For further understanding of a main gearbox and associated components thereof, which may be used in connection with the present invention, attention is directed to U.S. patent application Ser. No. 11/140,762, entitled SPLIT TORQUE GEARBOX FOR ROTARY WING AIRCRAFT WITH TRANSLATIONAL THRUST SYSTEM, which is assigned to the assignee of the instant invention and which is hereby incorporated by reference in its entirety.

Each engine E preferably drives the variable speed gearbox 40 through an engine freewheel unit 42 as generally understood by one of ordinary skill in the art to permit single engine operation and autorotation should all engines fail. Although only the gear train from engine #1 will be discussed in detail herein, the gear train from engine #2 is identical and it should be understood that any number of engines E may be utilized with the present invention.

The variable speed gearbox 40 of the present invention permits at least two different rotor speeds for the main rotor system 12 without disengaging the engines E or changing engine RPM. The variable speed gearbox 40 facilitates different flight profiles, such as a low speed flight profile and a high speed flight profile for any rotary wing aircraft. Typically during landing, take-off, hover and low speed flight profiles, a higher main rotor speed is required for increased lifting capabilities while in a high speed cruise flight profile, a lower main rotor speed is desired for improved rotor performance and increased airspeed.

The variable speed gearbox 40 includes a clutch, preferably a multi-plate clutch 44, and a freewheel unit 46 for each engine E. The multi-plate clutch 44 and the freewheel unit 46 are driven in parallel. A high speed input shaft 48 from the engine freewheel unit 42 drives the variable speed gearbox 38 primarily through a gear path 50, (illustrated schematically as shafts 48, 44i, and 44o) when the clutch 44 is engaged and primarily through a reduced gear path 52, preferably through a two-stage gear reduction 52a, 52b (reduced gear path 52 illustrated schematically herein as the gear path of 48, 52a, 46i, 46o, 52b) when the clutch 44 is disengaged. It should be understood that various gear ratios will be usable with the present invention and that "gear path" as discussed herein is with reference to a first gear path which drives the main rotor system 12 in a direct drive which includes a clutch and that "reduced gear path" as discussed herein is with reference to a second gear path which includes a freewheel unit and a gear reduction, but are not otherwise limiting.

The variable speed gearbox 40 preferably drives the main gearbox 38 in a direct drive (1 to 1 ratio) "high rotor speed mode" when the clutch 44 is engaged to drive the main rotor system 12 at high rotor rpm. In this mode, a freewheel output 46o of the freewheel unit 46 is rotating faster than a freewheel input 46i of the freewheel unit 46, so that the freewheel unit 46 overruns and does not transmit power. A relatively lower torque at relatively higher RPM is thereby transmitted for a given engine horsepower.

For the high speed cruise flight profile with a lower rotor RPM in a "low rotor speed mode," the clutch 44 is disengaged and power is transferred preferably from the input shaft 48, to an initial gear reduction 52a through the freewheel unit 46 to another gear reduction 52b, and into the main gearbox 38. It should be understood that "high rotor speed mode" and "low rotor speed mode" are utilized herein only as relative terms regarding the speed of the main gearbox 38 due to operation of the variable speed gearbox 40 and should not be considered otherwise limiting. With the clutch 44 disengaged, a clutch input 44i of the clutch 44 is spinning at the same speed as the engine E and a clutch output 44o of the clutch 44 is spinning at a reduced speed as a result of the gear reduction as connected by the freewheel unit 46. A relatively higher torque at a lower RPM is thereby transmitted for a given engine horsepower.

Notably, both the gear path 50 and the reduced gear path 52 continue to rotate irrespective of engagement/disengagement of the clutch 44 so that the clutch 44 and freewheel unit 46 need only accommodate the relative difference in speed and inertia between the gear ratios of the gear path 50 and the reduced gear path 52. This provides a lightweight and rapid reacting system compared to a conventional transmission which must accelerate or decelerate part of the drive system from or to zero speed.

The gearbox configuration of the present invention provides a lightweight system while assuring operation in the event of a clutch seizure or complete clutch slip. In the event of a clutch seizure, power is still transmitted from the engine to the main gearbox. In the event of a clutch slipping, power is automatically diverted through the freewheel unit to the main gearbox.

Transition from "low rotor speed mode" back to the "high rotor speed mode" such as when an aircraft is decelerating from cruise flight to a hover, requires engaging the clutch 44 and allowing the main rotor speed to increase until the clutch output 44o matches the speed of the clutch input 44i and the clutch 44 fully locks. The clutch 44 may be operated in an on/off manner or in a feathering manner in which engagement/disengagement is gradually applied.

Transitions between the "low rotor speed mode" and the "high rotor speed mode" are alternatively assisted through aircraft flight control methods. Preferably, main rotor speed is increased or decreased via rotor collective pitch control and aircraft flight attitude. That is, to change the amount of lift generated by the rotor system, either the speed and/or the blade angle of attack may be changed. If the angle of attack and the speed are changed in such a way that those changes cancel each other out, the same amount of lift is produced. Therefore, when transitioning from "low rotor speed mode" to "high rotor speed mode," collective pitch is modulated to lower the angle of attack of the blades as the rotor speed increases to provide the same amount of lift throughout the transition. In addition, when the angle of attack is decreased, the amount of drag produced is also decreased which increases rotor speed for equivalent power. For the transition from a "high rotor speed mode" to a "low rotor speed mode," the opposite generally occurs. With aircraft flight control methods, transitions are rapidly facilitated with less inertia loads applied to the clutch.

Figure 2B:
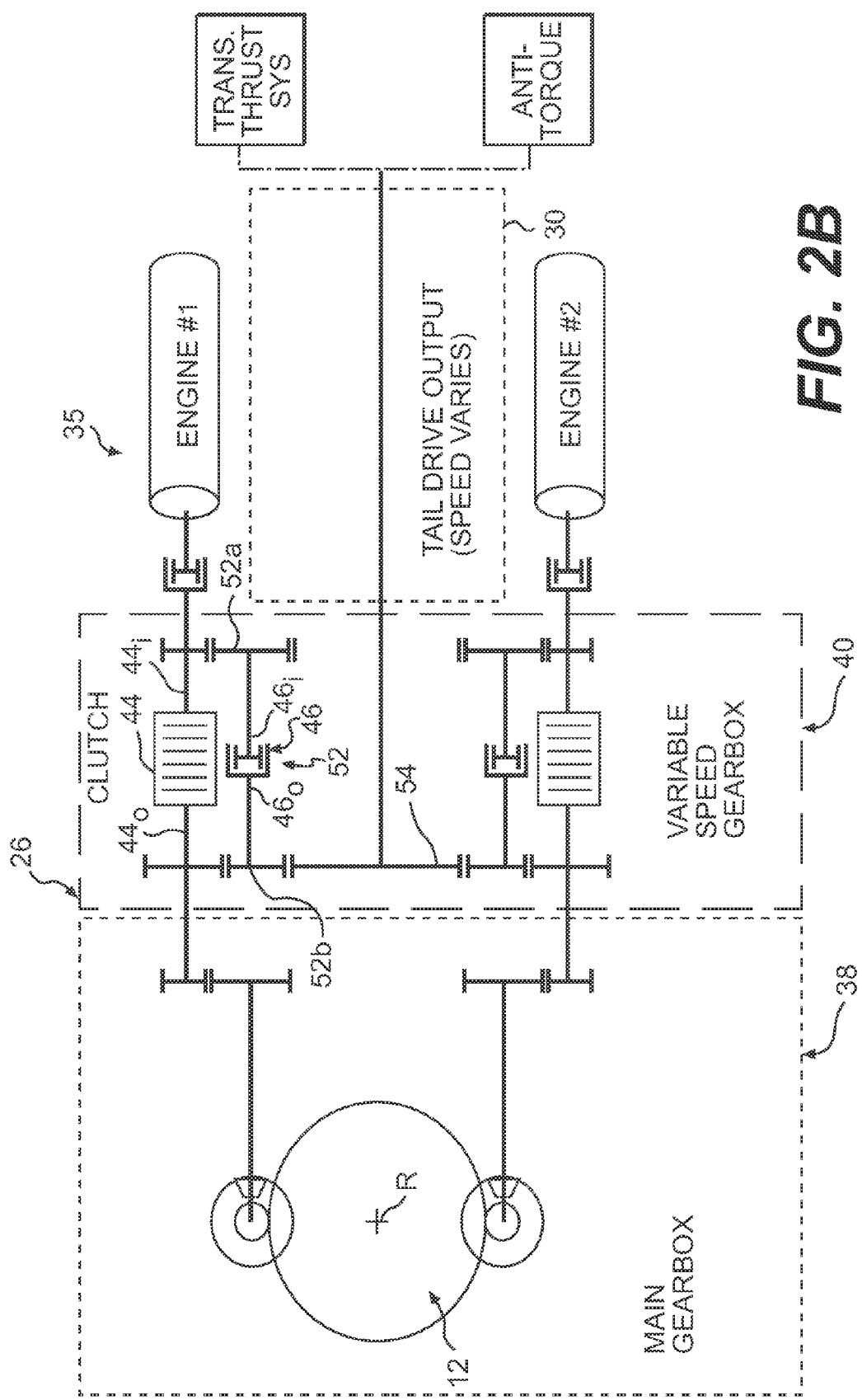
FIG. 2B is a block diagram of an alternative transmission gearbox system of the present invention.

The variable speed gearbox 40 may also be configured for a tail drive system 30 that operates at a continuous speed (FIG. 2A), a tail drive system that changes speed with the main rotor system 12 (FIG. 2B) or with no tail drive system 30 (FIG. 2C). FIGS. 2A and 2B are preferably utilized with either a high speed compound rotary wing aircraft 10 having an optional translational thrust system 32 (FIGS. 1A and 1B) or the more conventional aircraft 10' configurations (FIG. 1C) with an anti-torque tail rotor system 32'.

The variable speed gearbox 40 may drive the tail drive system 30 through a tail drive gear reduction 54 in meshing engagement therewith. For aircraft that require a continuous tail speed, the tail drive system 30 of FIG. 2A is preferably utilized in which the tail drive system is in meshing engagement with the input side of the clutch 44 and freewheel unit 46 to thereby maintain a fixed gear ratio relative the engine E. For aircraft that would benefit from a tail drive system 30 which changes speed commensurate with the main rotor system 12, the tail drive system 30 of FIG. 2B is preferably utilized in which the tail drive system is in meshing engagement with the output side of the clutch 44o and freewheel unit 46o or directly to the main gearbox 26 to thereby maintain a fixed gear ratio relative the main rotor shaft.

The choice of tail drive system 30 configuration is determined by several factors including tail rotor efficiency, noise requirements, performance objectives, etc. The amount of force the anti torque tail rotor is required to generate in order to counteract the torque of the main rotor must change when the main rotor speed changes, and as a result torque, changes.

To compensate for a change in main rotor torque, the tail rotor can either change its angle of attack and maintain the same speed (FIG. 2A), maintain the same angle of attack and change speed (FIG. 2B), or change both (FIG. 2B). The FIG. 2B configuration may alternatively be utilized with a compound helicopter where the tail rotor changes orientation to provide force to counteract the main rotor torque in hover and then transition to a pusher propeller orientation to provide translational thrust during a high speed flight profile.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A transmission gearbox comprising:
a main gearbox; and
a variable speed gearbox in meshing engagement with said main gearbox, said variable speed gearbox includes a gear path having a clutch and a reduced gear path having a freewheel unit parallel to said gear path having said clutch, said main gearbox driven at a first speed in response to engagement of said clutch, said main gearbox driven at a second speed less than said first speed in response to disengagement of said clutch wherein said main gearbox is driven at said first speed in response to engagement of said clutch such that a freewheel output of said freewheel unit overruns a freewheel input of said freewheel unit and wherein said freewheel input is in meshing engagement with a clutch input.

2. The transmission gearbox as recited in claim 1, wherein an output of said gear path downstream of said clutch and an output of said reduced gear path downstream of said freewheel unit are both driven while said main gearbox is driven at either said first speed and said second speed.

3. The transmission gearbox as recited in claim 1, further comprising a rotor system driven by said main gearbox.

4. The transmission gearbox as recited in claim 3, wherein said rotor system includes a coaxial counter-rotating rotor system.

5. The transmission gearbox as recited in claim 3, wherein said rotor system includes a single main rotor system.

6. The transmission gearbox as recited in claim 1, further comprising a tail drive system driven by said variable speed gearbox.

7. The transmission gearbox as recited in claim 6, wherein said tail drive system is driven from an input side of said gear path.

8. The transmission gearbox as recited in claim 7, wherein said tail drive system is an anti-torque tail rotor.

9. The transmission gearbox as recited in claim 7, wherein said tail drive system is a translational thrust system.

10. The transmission gearbox as recited in claim 6, wherein said tail drive system is driven from an output side of said gear path.

11. The transmission gearbox as recited in claim 10, wherein said tail drive system is an anti-torque tail rotor.

12. The transmission gearbox as recited in claim 10, wherein said tail drive system is a translational thrust system.

13. The transmission gearbox as recited in claim 1, wherein both said gear path and said reduced gear path continue to rotate irrespective of engagement/disengagement of said clutch.

14. The transmission gearbox as recited in claim 1, wherein said clutch and said freewheel unit accommodate a relative difference in speed and inertia between a gear ratios of said gear path and said reduced gear path.

15. The transmission gearbox as recited in claim 1, wherein said clutch and said freewheel unit are driven by a single gas turbine engine.

16. The transmission gearbox as recited in claim 15, wherein said main gearbox is driven at said second speed to drive a rotor system at a low rotor speed mode.

17. The transmission gearbox as recited in claim 16, wherein said main gearbox is driven at said first speed to drive said rotor system at a high rotor speed mode.

18. The transmission gearbox as recited in claim 1, further comprising a tail drive system driven by said variable speed gearbox and a main rotor system driven by said main gearbox.

19. The transmission gearbox as recited in claim 18, wherein said tail drive system axis of rotation is transverse to said main rotor system axis of rotation.

20. The transmission gearbox as recited in claim 1, wherein said variable speed gearbox is driven by a gas turbine engine and said main gearbox is driven by said variable speed gearbox.

21. The transmission gearbox as recited in claim 1, wherein said freewheel output is in meshing engagement with a clutch output.

22. The transmission gearbox as recited in claim 1, wherein overruns a freewheel input of said freewheel unit, said main gearbox driven at said second speed in response to disengagement of said clutch such that a clutch output of said clutch rotates at a speed less than a clutch input of said clutch, said freewheel output driven by said freewheel input.

23. A transmission gearbox comprising: a main gearbox, and a variable speed gearbox in meshing engagement with said main gearbox, said variable speed gearbox includes a gear path having a clutch and a reduced gear path having a freewheel unit parallel to said gear path having a clutch, said main gearbox driven at a first speed in response to engagement of said clutch, said main gearbox driven at a second speed less than said first speed in response to disengagement of said clutch, wherein said main gearbox is driven at said second speed in response to disengagement of said clutch such that a clutch output of said clutch rotates at a speed less than a clutch input of said clutch, a freewheel output driven by a freewheel input, and wherein said freewheel input is in meshing engagement with a clutch input wherein said freewheel input is in meshing engagement with a clutch input.

24. The transmission gearbox as recited in claim 23, wherein said freewheel output is in meshing engagement with a clutch output.

* * * * *